United States Patent
Bang

(10) Patent No.: US 6,172,836 B1
(45) Date of Patent: Jan. 9, 2001

(54) METHOD AND APPARATUS FOR WRITING THE SERVO PATTERN FOR DETECTING FINE DEFECTS IN THE SERVO BURST SIGNALS OF A HARD DISK DRIVE

(75) Inventor: Ho-Yul Bang, Suwon (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 08/777,136

(22) Filed: Dec. 30, 1996

(30) Foreign Application Priority Data

Dec. 29, 1995 (KR) .................................. 95/64238

(51) Int. Cl.$^7$ ................................... G11B 21/02
(52) U.S. Cl. ........................... 360/75; 360/77.08
(58) Field of Search ................... 360/48, 77.08, 360/77.02, 75, 77.04, 78.04, 51, 31, 53, 49, 45, 25

(56) References Cited

U.S. PATENT DOCUMENTS

| | | |
|---|---|---|
| 4,032,984 | 6/1977 | Kaser et al. . |
| 4,380,029 | 4/1983 | Bode . |
| 4,511,938 * | 4/1985 | Betts et al. ...................... 360/77.08 |
| 4,530,019 | 7/1985 | Penniman . |
| 4,766,508 * | 8/1988 | Mathewson .................. 360/77.08 X |
| 5,041,926 * | 8/1991 | Ockerse et al. ................. 360/77.05 |
| 5,089,757 * | 2/1992 | Wilson ........................ 360/77.08 X |
| 5,202,802 * | 4/1993 | Sidman ................................ 360/75 |
| 5,293,276 * | 3/1994 | Dunn et al. ............................ 360/51 |
| 5,339,207 | 8/1994 | Moon et al. . |
| 5,388,010 * | 2/1995 | Norton, Jr. .................... 360/77.08 X |
| 5,396,380 | 3/1995 | Shimizu et al. . |
| 5,400,201 | 3/1995 | Pederson . |
| 5,434,725 | 7/1995 | Hirose et al. . |
| 5,453,888 * | 9/1995 | Tsunoda et al. ................. 360/77.08 |
| 5,515,212 | 5/1996 | Chiao et al. . |
| 5,544,135 | 8/1996 | Akin, Jr. et al. . |
| 5,570,247 | 10/1996 | Brown et al. . |
| 5,576,906 | 11/1996 | Fisher et al. . |
| 5,576,910 * | 11/1996 | Romano et al. ................. 360/77.08 |
| 5,583,713 * | 12/1996 | Real et al. ...................... 360/77.08 |
| 5,587,850 | 12/1996 | Ton-that . |
| 5,600,506 | 2/1997 | Baum et al. . |
| 5,625,508 * | 4/1997 | Brown et al. ................. 360/77.08 X |
| 5,706,265 * | 1/1998 | Bang ................................. 360/73.03 |

* cited by examiner

Primary Examiner—Hoa T. Nguyen
Assistant Examiner—K. Wong
(74) Attorney, Agent, or Firm—Robert E. Bushnell, Esq.

(57) ABSTRACT

A method of providing the servo pattern for detecting fine defects in the servo burst signals of a hard disk drive (HDD) comprises the steps of writing a preamble portion for providing a servo sync signal in reading servo data together with a gap to inform of a servo sector, writing a servo address mark (SAM) for notifying the start of the servo to provide a sync signal to read the following gray code, writing the gray code for providing the identification data ID of a track, and writing a burst signal portion consisting of multiple repetition of the position error signal required for even or odd numbered track data and track following.

26 Claims, 4 Drawing Sheets

METHOD AND APPARATUS FOR WRITING THE SERVO PATTERN FOR DETECTING FINE DEFECTS IN THE SERVO BURST SIGNALS OF A HARD DISK DRIVE

CLAIM OF PRIORITY

This application makes claims all benefits accruing under 35 U.S.C. §119 from an application for METHOD OF WRITING THE SERVO PATTERN FOR DETECTING FINE DEFECTS IN THE SERVO BUST SIGNALS OF A HARD DISK DRIVE AND DRIVE CIRCUIT THEREFOR earlier filed in the Korean Industrial Property Office on Dec. 30, 1995 and there duly assigned Ser. No. 64238/1995.

BACKGROUND OF THE INVENTION

1. Field of the Invention

The present invention concerns a hard disk drive (HDD), and more particularly a method of writing the servo pattern for detecting fine defects in the servo burst signals and a drive circuit therefor.

2. Description of the Related Art

HDDs are widely used as auxiliary memory devices of computer systems because they provide means for accessing a large amount of data at high speed. In addition, many efforts have been made to increase the data storage capacity of an HDD in order to meet the needs in the informational age, i.e., to increase the number of the tracks per inch (TPI) of the platters (disks). High TPI density involves problems relating to servo control because the narrowed gap between the tracks reduces the off-track margins of the position error signals (PES) by which the heads follow the tracks. The servo pattern of a conventional HDD is described with reference to FIG. 1 illustrating the conventional format of the servo sector.

The servo sector consists of a preamble portion, servo address mark (SAM) portion, gray code portion, portion of the burst signals A, B, C, D, and timing margin portion PAD. The preamble provides a servo sync signal for reading the servo data together with a gap to indicate of the servo sector. The SAM indicates the start of the servo providing a sync signal to read the following gray code. The gray code 10, 11, 12, 13 provides the identification data ID of each track. The track data is changed by one bit when the heads move through the gray codes, written by half track in the servo writer. The burst signals A, B, C, D provide the position error signals PES required to follow the tracks. In the embedded sector servo mechanism, the burst signals C, D are usually employed for positioning the heads on-track, the burst signal A for distinguishing the even numbered tracks, and the burst signal B for distinguishing the odd numbered tracks. The PAD provides a timing margin required after reading the servo data.

Referring to FIG. 2 illustrating the on-track timing diagrams of the burst signals A, B, C, D read from the disk prepared with a servo sector format as shown in FIG. 3, reference symbol 2a indicates the servo sector of a certain track, signal BS the burst signals A, B, C, D read by a head and amplified, signal SE a sample & hold enable signal, signal FBS the full wave rectified burst signals A, B, C, D obtained through an automatic gain control (AGC) circuit, and signals SA to SD the burst signals A, B, C, D applied to sample & hold circuits. Signal RS is a reset signal to discharge the burst signals A, B, C, D applied to the sample & hold circuits. Among these signals SA to SD, SA has the highest level and SB the lowest level while SC and SD have the same level which is midway between SA and SB. The charged level of each of the signals SA to SD corresponds to the area of the eight half waves of the corresponding signal. The signals SA to SD are maintained at the charged levels until the reset signal RS is enabled.

In such burst signal detection of sample & hold, the charged levels using the sampled burst signals vary with the pulse number and area of the burst signals. Namely, a disk having a high track density burst to have a high storage capacity has defects of various sizes, which, if they exist in the portion of the burst signals A, B, C, D after the servo writing, considerably affect the position error signals PES. The conventional HDD may not detect the fine defects existing in the burst signals by employing the sampled signals except that the defects are large enough to influence the levels of the sampled signals, thereby resulting in errors in the servo control.

SUMMARY OF THE INVENTION

It is an object of the present invention to provide an improved servo control mechanism by writing the servo pattern so as to detect fine defects in the servo burst signals of an HDD.

According to the present invention, a method of providing the servo pattern for detecting fine defects in the servo burst signals of a hard disk drive (HDD) comprises the steps of:

writing a preamble portion which includes a servo sync signal for reading servo data together with a gap to indicate of a servo sector;

writing a servo address mark (SAM) indicating the start of the servo to provide a sync signal to read the following gray code;

writing the gray code for providing the identification data ID of a track; and writing a burst signal portion consisting of multiple repetitions of the position error signal required for even or odd numbered track data and track following.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
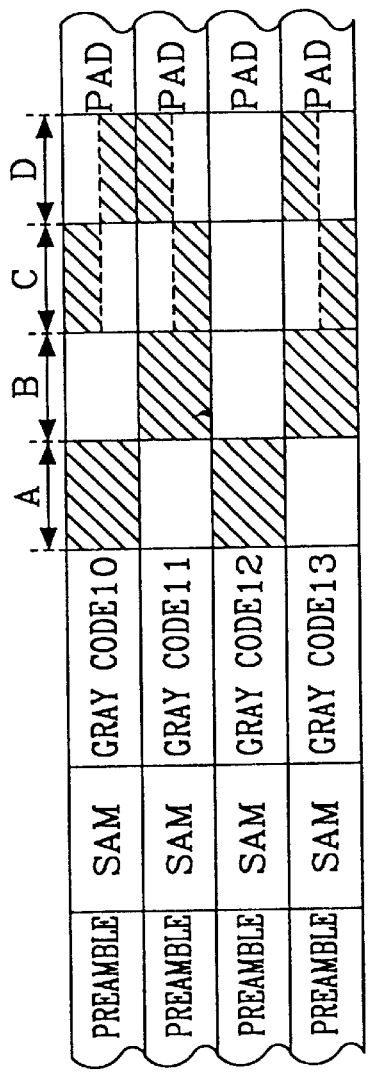
FIG. 1 is a schematic diagram illustrating the format of the servo sector of an HDD.
Figure 3:
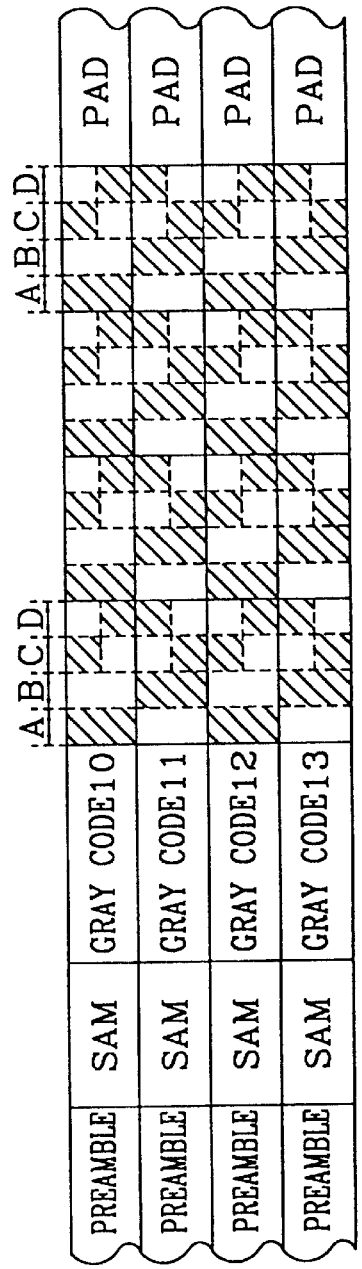
FIG. 3 is a schematic diagram illustrating a format of the servo sector of an HDD according to the present invention.
Figure 2:
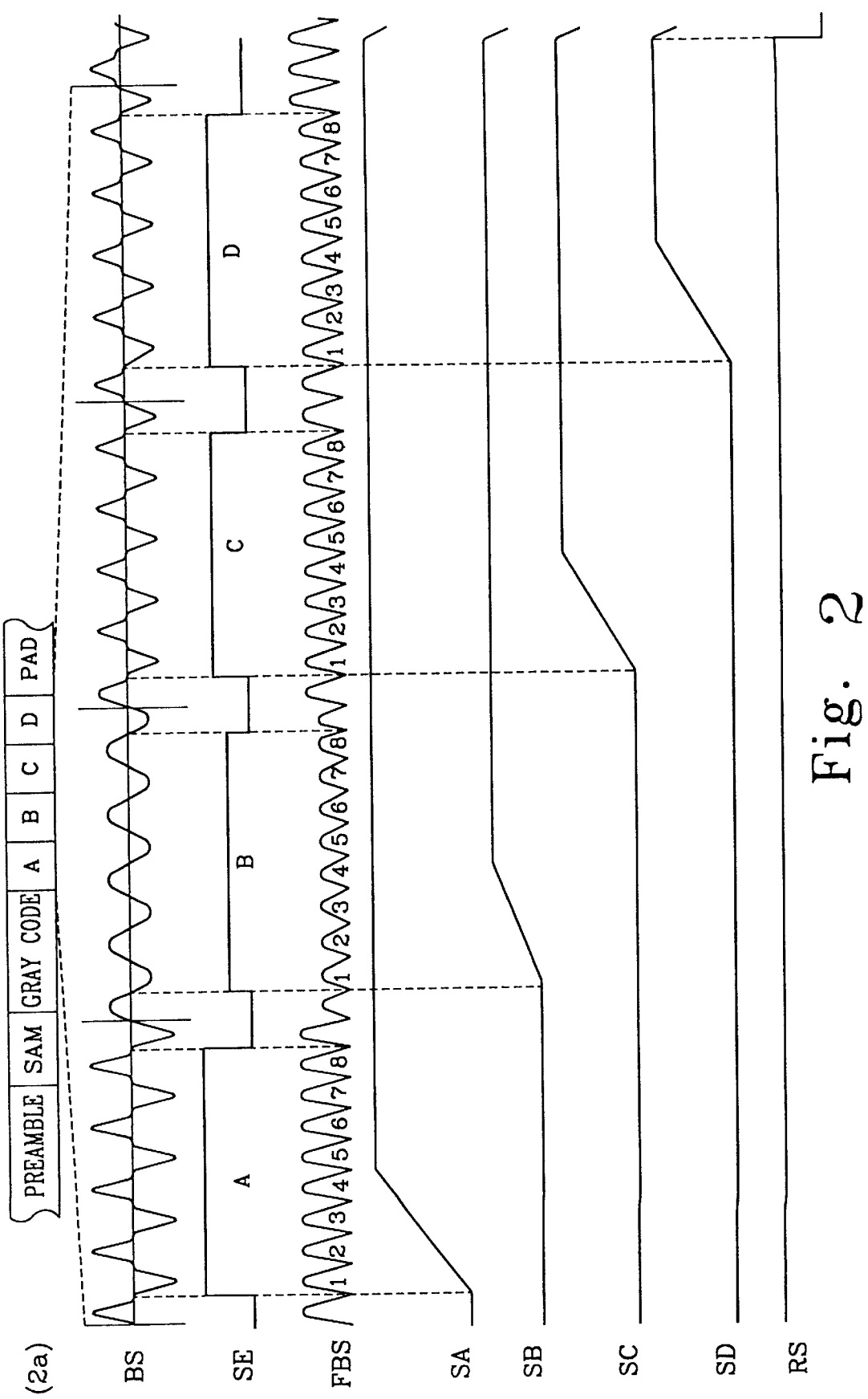
FIG. 2 is a timing diagram illustrating the operations according to FIG. 1.

Referring to FIG. 3, the burst signals A, B, C, D are recorded four times in order to detect the fine defects existing in the burst signals. The portions of preamble, gray codes 10–13, burst signals A, B, C, D, and timing margin PAD have the same spaces as those in FIG. 1.

Figure 4:
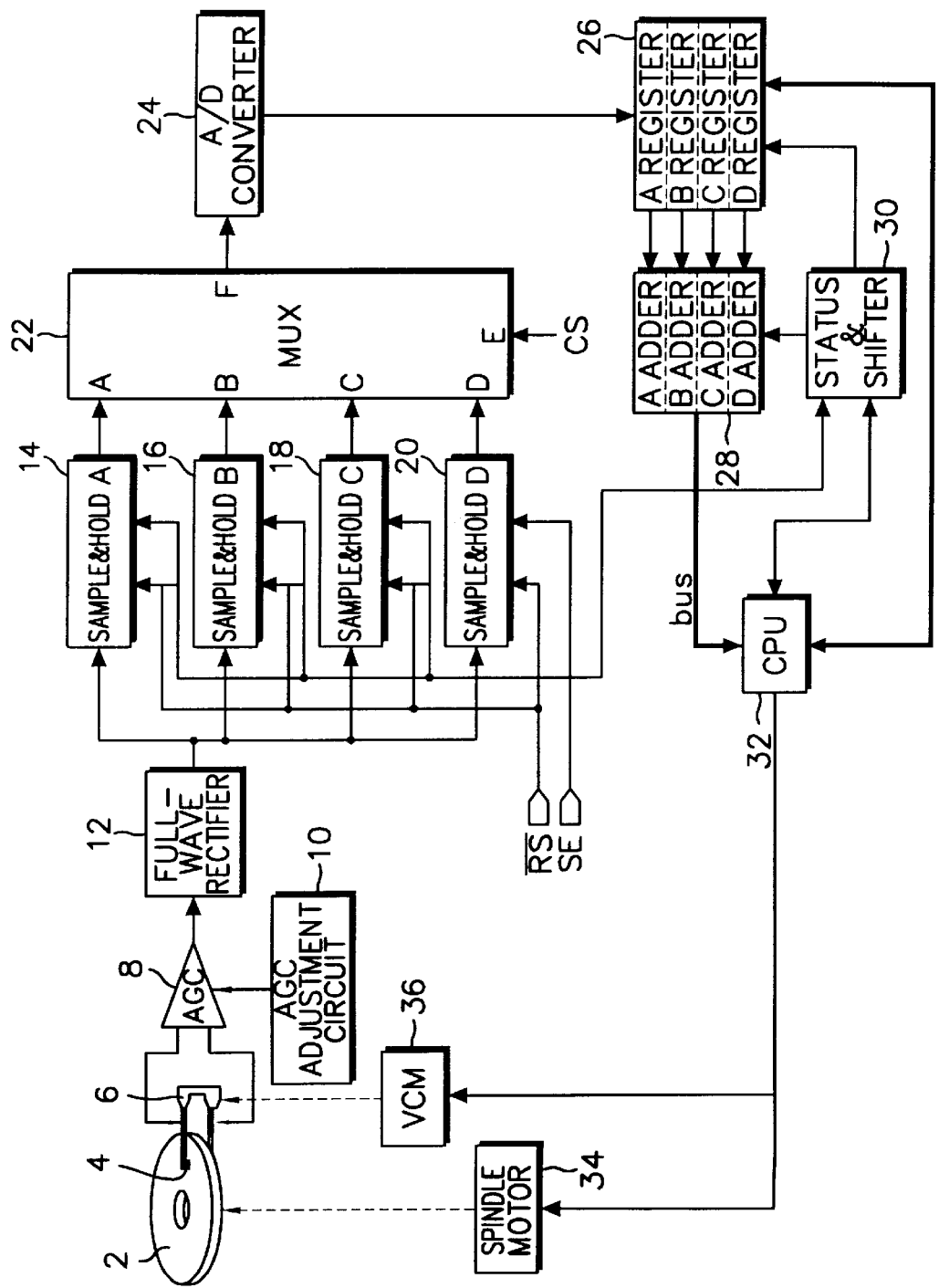
FIG. 4 is a diagram illustrating a drive circuit for detecting fine defects in the servo burst signals according to the present invention.

Describing the drive circuit for detecting fine defects in the servo burst signals with reference to FIG. 4, a disk 2 is rotated by a spindle motor 34 so as to store the data transferred from a host in the form of magnetic energy. Heads 4 are mounted on arms perpendicularly extending from an actuator 6 to read data from the disk 2 or write data transferred from the host onto the disk 2. An AGC 8 mounted in a read/write channel part controls gain of the burst signals BS read by the head 4 under the control of an AGC adjustment circuit 10. A full-wave rectifier 12 is provided to rectify the full waves of the burst signals BS amplified by the AGC 8. The full-wave rectified burst signals FBS of the full-wave rectifier 12 are applied to respective sample & hold circuits 14, 16, 18 and 20 in response to a sample & hold enable signal SE. The sample & hold circuits 14, 16, 18, 20 maintain the charged levels of the burst signals A, B, C, D until they are reset by a reset signal RS.

A multiplexer (MUX) 22 multiplexes the sampled signals SA, SB, SC, SD obtained from the sample & hold circuits 14, 16, 18, 20 via the terminals A, B, C, D and provides a multiplexed output to an A/D converter 24 according to a MUX control signal CS. The A/D converter 24 converts the sampled and multiplexed signals SA–SD delivered from the MUX 22 into digital signals applied to a register circuit 26, which also delivers the digitally converted and multiplexed signals SA, SB, SC, SD to an adder circuit 28 according to the output signal of a status and shifter 30. Then, the adder circuit 28 adds the sampled and multiplexed signals SA, SB, SC, SD and transfers the adder output to a CPU 32. The register circuit 26 and adder circuit 28 respectively consist of four registers and four adders. The status and shifter 30 transfers the output of the adder circuit 28 to the CPU 32 according to a sampling enable signal SE. The CPU 32 generates track following data based on the output of the adder circuit 28 which performs adding operations on the charged levels of the sampled signals SA, SB, SC, SD, and employs that data to control the spindle motor 34 and/or VCM 36.

Figure 5:
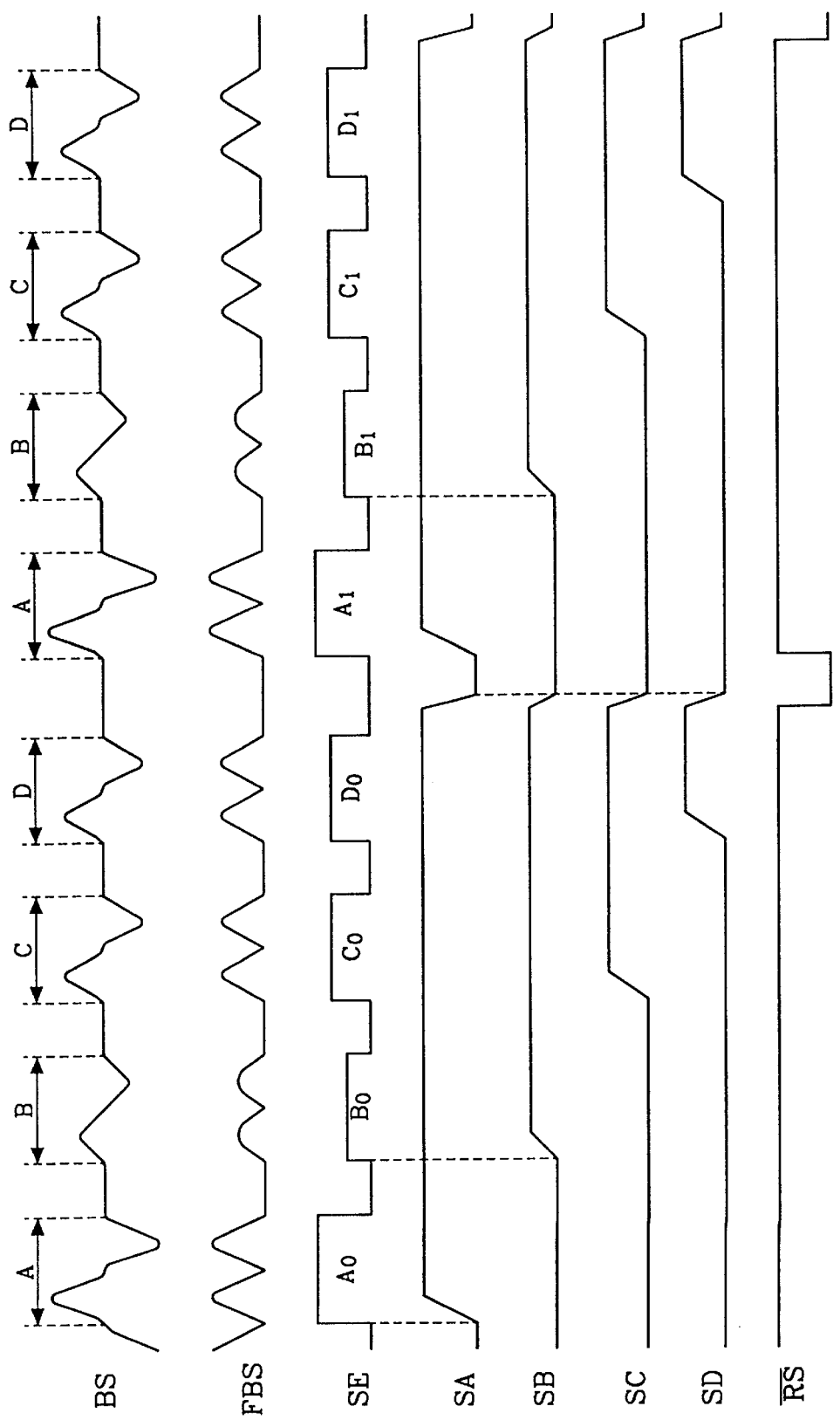
FIG. 5 is a timing diagram illustrating the operations according to FIG. 3.

Referring to FIG. 5 burst illustrating the operational timing of the burst signals BS and sampled signals SA, SB, SC, SD read from the disk 2, the burst signals BS are read by the head 4 are preamplified and applied to the AGC 8. The burst signals BS consist of different portions A, B, C, D repeated four times according to the present invention (illustrated as repeated twice in FIG. 5). The length of the burst signals SA, SB, SC, SD is set to be at the maximum four pulses. Reference symbol FBS represents the burst signals full-wave rectified by the full-wave rectifier 12 as shown in FIG. 4, and SE the sample & hold enable signal applied to the sample & hold circuits 14, 16, 18, 20 providing window regions to sample the burst signals A, B, C, D. Reference symbols SA, SB, SC, SD represent the signals sampled from the full-wave rectified burst signal FBS and applied to the sample & hold circuits 14, 16, 18, 20, respectively. The sampled signals SA, SB, SC, SD are charged by the areas of the full-wave rectified pulses of the respective burst signals A, B, C, D in response to the sample & hold enable signal SE and are discharged by the reset signal RS. Hereinafter will be described the operation of the drive circuit for detecting fine defects existing the burst signals with reference to FIGS. 3 to 5.

In servo control, the head 4 reads data from the disk having the servo sector format as shown in FIG. 3. The data is applied to the AGC 8 which amplifies it to at a given level to generate the adjusted burst signals BS transferred to the full-wave rectifier 12. The burst signals BS are transformed by the full-wave rectifier 12 into the full-wave rectified burst signals FBS applied to the sample & hold circuits 14 to 20, which are respectively charged with the full-wave rectified burst signals FBS according to the sampling enable signal SE. Namely, in the first interval A0 of the sampling enable signal SE, the sample & hold circuit 14 is charged with a value corresponding to the area of two half waves of the burst signal A in the full-wave rectified burst signal FBS. In this way, the remaining three sample & hold circuits 16, 18, 20 are sequentially charged with the respective values corresponding to the burst signals B, C, D. Then, the sampled signals SA, SB, SC, SD corresponding to the areas of the respective pulses of the full-wave rectified burst signals FBS are transferred to the MUX 22, which in turn transfers the sampled signals SA, SB, SC, SD to the A/D converter 24 according to the control signal CS. The sampled signals SA, SB, SC, SD are digitally converted by the A/D converter 24 and loaded in the respective registers A, B, C, D, and are then transferred to the adder circuit 28 by the status and shifter 30 upon enabling the reset signal RS. The adders A, B, C, D add the charged levels of the respective sampled signals SA, SB, SC, SD delivered by the register circuit 26, so that the CPU 32 receives the charged level values A0, A1, B0, B1, C0, C1, D0, D1 of the sampled signals SA, SB, SC, SD and the added values A0+A1, B0+B1, C0+C1, D0+D1 through a bus to detect the fine defects in the burst signals.

Thus, the present invention provides means for detecting the fine defects existing in the servo burst signals, so that the servo control is effective to secure a reliable HDD with high speed and large storage capacity. In the present embodiment, the servo pattern is provided with the burst signals A, B, C, D repeated twice to detect the fine defects, but the burst signals may be repeated more than twice without any particular modification.

Although the present invention has been described with reference to specific embodiments, it will be also noted that various modifications may be made without departing the gist of the present invention.

What is claimed is:

1. A method of providing a servo pattern for detecting fine defects in servo burst signals of a hard disk drive (HDD), comprising the steps of:

recording a preamble for providing a servo sync signal in reading servo data together with a gap to inform of a servo sector;

recording a servo address mark (SAM) indicating a start of a servo to provide a sync signal to read a following gray code; and recording said gray code for providing identification data ID of a track wherein said preamble, said SAM and said gray code are recorded within a same servo sector, and wherein said servo burst signals required for controlling a position of a head at a time of servo control are repeatedly written a plurality of times within said same servo sector in order to detect the fine defects in said servo burst signals.

2. The method as defined in claim 1, wherein said plurality of times for repeatedly writing said servo burst signals in said same servo sector comprises at least four times.

3. The method as defined in claim 1, further comprising the steps of:

sampling the servo burst signals;

generating a sample signal with a level according to a total area of pulses of the sampled servo burst signals; and using the sample signal as a basis for controlling the sampling step and for detecting the fine defects in the servo burst signals.

4. The method as defined in claim 3, further comprising the step of controlling a gain of said servo burst signals prior to sampling the servo burst signals.

5. The method as defined in claim 3, further comprising the step of full-wave rectifying the servo burst signals prior to sampling the servo burst signals.

6. The method as defined in claim 3, further comprising the step of converting the sample signal into a digital signal.

7. The method as defined in claim 3, further comprising the step of temporarily storing a charged level of the sample signal in order to generate outputs.

8. The method as defined in claim 7, further comprising the step of outputting the charged level of said sample signal upon enabling a signal to reset and restart the sampling step.

9. The method as defined in claim 7, further comprising the step of adding the outputs generated in said step of temporarily storing the charged level of the sample signal to produce an adder output.

10. The method as defined in claim 9, further comprising the step of performing servo control in response to the adder output produced in said adding step.

11. A drive circuit for detecting fine defects in servo burst signals of a hard disk drive (HDD), said servo burst signals being repeatedly written within a same servo sector, comprising:
    a plurality of heads for reading said servo burst signals;
    an automatic gain controller (AGC) for controlling a gain of said servo burst signals read by said heads;
    a rectifier for full-wave rectifying the servo burst signals controlled by said AGC;
    a sample and hold circuit for generating a sample signal with a level according to a total area of pulses of the servo burst signals rectified by said rectifier in response to a sample and hold enable signal;
    analog to digital (A/D) converter means for converting the sample signal of said sample and hold circuit into a digital signal;
    charged level storing means connected to said A/D converter means for temporarily storing a charged level of the sample signal obtained from said A/D converter means and for generating outputs;
    first control means for outputting the charged level of said sample signal stored in said charged level storing means upon enabling a signal to reset said sample and hold circuit;
    adder means connected to said charged level storing means for adding the outputs of said charged level storing means to produce an adder output; and
    second control means for performing servo control in response to the adder output of said adder means.

12. A drive circuit for detecting fine defects in servo burst signals of a hard disk drive (HDD), said circuit comprising:
    a plurality of heads for reading said servo burst signals;
    sample and hold circuit means for generating a sample signal having a level according to a total area of pulses of the servo burst signals;
    first control means for outputting a charged level of said sample signal of said sample and hold circuit means upon generation of a signal to reset said sample and hold circuit means;
    adder means for adding successive charged levels of said sample signal outputted by said first control means to produce an adder output; and
    second control means for performing servo control in response to the adder output of said adder means;
    said circuit further comprising charged level storing means connected between said sample and hold circuit means and said adder means for temporarily storing a charged level of the sample signal prior to output thereof by said first control means.

13. The circuit as defined in claim 12, further comprising automatic gain control (AGC) means for controlling a gain of said servo burst signals read by said plurality of heads.

14. The circuit as defined in claim 12, further comprising rectifier means for full-wave rectifying the servo burst signals read by said plurality of heads.

15. The circuit as defined in claim 12, further comprising analog-to-digital (A/D) converter means for converting the sample signal of said sample and hold circuit into a digital signal.

16. The circuit as defined in claim 12, further comprising automatic gain control (AGC) means for controlling a gain of said servo burst signals read by said plurality of heads, and rectifying means for full-wave rectifying the servo burst signals controlled by said AGC means.

17. The circuit as defined in claim 16, further comprising analog-to-digital (A/D) converter means for converting the sample signal of said sample and hold circuit means into a digital signal.

18. The circuit as defined in claim 17, further comprising charged level storing means for temporarily storing a charged level of the sample signal obtained from said A/D converter means.

19. A drive circuit for detecting fine defects in servo burst signals of a hard disk drive, said circuit comprising:
    a plurality of heads for reading said servo burst signals;
    sample and hold circuit means for generating a sample signal having a level according to a total area of pulses of the servo burst signals; and
    control means for controlling said sample and hold circuit means by using the sample signal as a basis for controlling said sample and hold circuit means, thereby detecting the fine defects in said servo burst signals.

20. The circuit as defined in claim 19, wherein said control means comprises a first control circuit for outputting a charged level of said sample signal of said sample and hold signal circuit means upon generation of a signal to reset said sample and hold circuit means.

21. The circuit as defined in claim 20, wherein said control means further comprises an adder circuit for adding successive charged levels of said sample signal outputted by said first control circuit to produce an adder output.

22. The circuit as defined in claim 21, wherein said control means further comprises a second control circuit for performing servo control in response to the adder output of said adder circuit.

23. The circuit as defined in claim 20, further comprising charged level storing means for temporarily storing a charged level of the sample signal prior to output thereof by said first control circuit.

24. The circuit as defined in claim 19, further comprising automatic gain control (AGC) means for controlling a gain of said servo burst signals read by said plurality of heads.

25. The circuit as defined in claim 19, further comprising rectifier means for full-wave rectifying the servo burst signals read by said plurality of heads.

26. The circuit as defined in claim 19, further comprising analog-to-digital (A/D) converter means for converting the sample signal of said sample and hold circuit means into a digital signal.

* * * * *